(No Model.)
A. F. GERALD.
Nail Extractor.
No. 232,703. Patented Sept. 28, 1880.
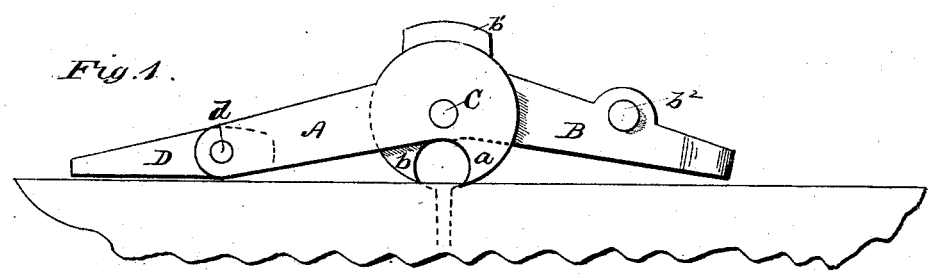
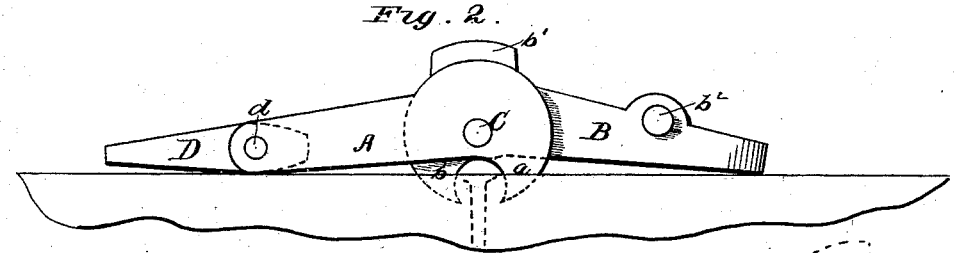
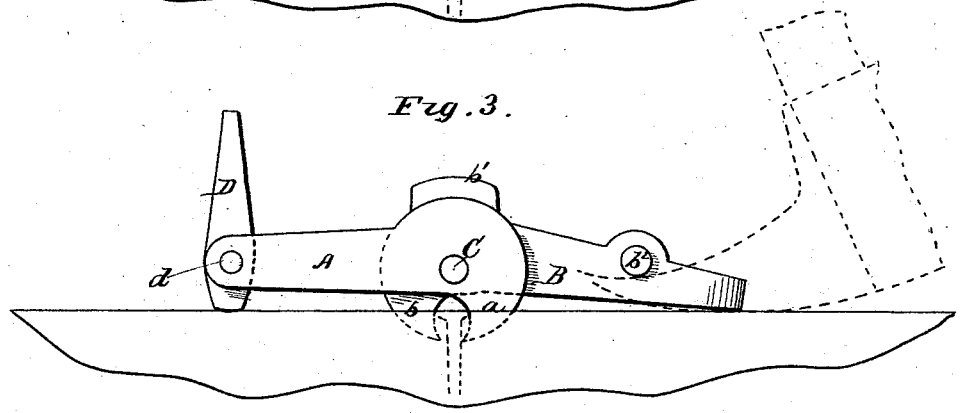
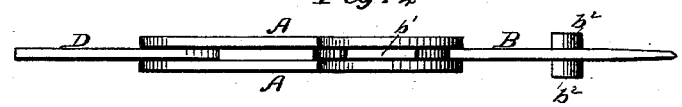
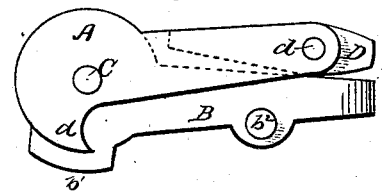
Attest:
W. H. H. Knight
Fred T. Church
Inventor,
Amos F. Gerald
By Hill & Church
His Attys.
N. PETERS, PHOTO-LITHOGRAPHER, WASHINGTON, D. C.

United States Patent Office.

AMOS F. GERALD, OF FAIRFIELD, ASSIGNOR OF TWO-THIRDS OF HIS RIGHT TO WILLIAM HARVEY, OF AUGUSTA, AND JOSEPH R. BODWELL, OF HALLOWELL, MAINE, ONE-THIRD TO EACH.

NAIL-EXTRACTOR.

SPECIFICATION forming part of Letters Patent No. 232,703, dated September 28, 1880.

Application filed July 29, 1880. (No model.)

*To all whom it may concern:*

Be it known that I, AMOS F. GERALD, of Fairfield, in the county of Somerset and State of Maine, have invented a certain new and Improved Nail-Extractor; and I do hereby declare the following to be a full, clear, and exact description of the same, reference being had to the accompanying drawings, forming part of this specification, in which—

Figures 1, 2, and 3 represent side views of the implement in different positions. Fig. 4 is a top view of it, and Fig. 5 a view showing it folded up.

Similar letters of reference in the several figures denote the same parts.

This invention has for its object to provide an improved implement for extracting nails, and for other uses, that shall be inexpensive to manufacture, simple in construction, and efficient in operation, and that can be folded up into small compass when not in use.

To this end the invention consists in the implement shown in the accompanying drawings, constructed and operated substantially as I will now proceed to describe.

A A represent two metal arms, each of which is somewhat enlarged at its inner end, and is provided with a hook-shaped jaw, $a$. Between these arms A A is arranged a third metal arm, B, also provided with a hook-shaped jaw, $b$, which is adapted to co-operate with the jaws $a$, and passing transversely through the ends of all three of the arms is a bolt or pivot, C, that operates to hold the arms together in their proper relation. The outer ends of the arms A A are held by a pin or rivet, $d$, and on said pin or rivet, between the arms, is pivoted a short metal lever, D. Arm B is further provided with a boss or projection, $b'$, that projects out from between the arms A A, and also with lateral studs or lugs $b^2 b^2$, near its outer end, for a purpose to be presently explained.

In the operation of the implement it is placed over the nail to be extracted in the position shown in Fig. 1, the jaws $a$ $b$ being on opposite sides of the nail-head and the lever D extended. While in this position a few sharp blows are given on the boss or projection $b'$, so as to drive the jaws into the wood, on each side of the nail-head, as shown in Fig. 2. The lever D is then raised until it stands on its shorter end, thus causing the jaws to gripe tightly under the head of the nail and secure a firm hold thereon, as shown in Fig. 3. By raising the outer end of arm B the nail is drawn wholly or partially out.

This raising of the arm may be accomplished in a variety of ways; but I prefer to employ an ordinary claw-hammer, as shown in Fig. 3, the claws of the hammer engaging with the lateral studs or lugs $b^2 b^2$. By operating the handle of the hammer the arm is raised, as will be obvious.

In order to make the implement more generally useful, the lever D is made in the form of a nail-set, and can be so used when desired. The outer end of the arm B is also tapered down, so as to form a serviceable screw-driver.

When the implement is not in use for any purpose it can be folded up into small compass, as shown in Fig. 5, and carried around conveniently in the pocket.

I claim as my invention—

1. In a nail-extractor, the combination of the arms A A, having the jaws $a$, with the arm B pivoted to the same, and having the co-operating jaw $b$, and with the lever D also pivoted to the arms A A, for causing the jaws to gripe the head of the nail after they are driven in on opposite sides of it, substantially as described.

2. The combination of the arms A A, having jaws $a$, with the arm B pivoted thereto, the lateral studs or lugs $b^2 b^2$, and the pivoted lever D, substantially as described.

AMOS F. GERALD.

Witnesses:
E. W. McFADDEN,
F. E. McFADDEN.